United States Patent
Griffith et al.

[11] Patent Number: 5,909,774
[45] Date of Patent: Jun. 8, 1999

[54] SYNTHETIC OIL-WATER EMULSION DRILL-IN FLUID CLEANUP METHODS

[75] Inventors: James E. Griffith, Loco; Jiten Chatterji, Duncan; Bobby J. King, Duncan; Bryan K. Waugh, Duncan; Patty L. Onan, Duncan, all of Okla.

[73] Assignee: Halliburton Energy Services, Inc., Duncan, Okla.

[21] Appl. No.: 08/935,276

[22] Filed: Sep. 22, 1997

[51] Int. Cl.⁶ .............................. E21B 43/27; E21B 43/28
[52] U.S. Cl. .................. 166/312; 166/291; 166/307; 166/311; 507/927; 507/933; 507/939; 507/261; 507/266
[58] Field of Search .................... 166/311, 312, 166/307, 291; 507/927, 933, 261, 266, 929

[56] References Cited

U.S. PATENT DOCUMENTS

| | | | |
|---|---|---|---|
| 3,077,454 | 2/1963 | Monroe et al. | 252/148 |
| 4,028,268 | 6/1977 | Sullivan et al. | 252/392 |
| 5,008,026 | 4/1991 | Gardner et al. | |
| 5,189,012 | 2/1993 | Patel et al. | 507/103 |
| 5,589,442 | 12/1996 | Gee et al. | 507/103 |

*Primary Examiner*—Tamara Graysay
*Assistant Examiner*—Chi H. Kang
*Attorney, Agent, or Firm*—Craig W. Roddy; C. Clark Dougherty, Jr.

[57] ABSTRACT

The present invention provides methods of cleaning up a producing interval of a well bore drilled using a synthetic oil-water emulsion drill-in fluid. The methods basically comprise contacting filter cake and drill-in fluid on the walls of the well bore with three treatment fluids in three stages, the first and second treatment fluids being comprised of water, a filter cake dissolving acid, a mutual solvent and an emulsion penetrating agent. The third treatment fluid is comprised of water, a filter cake dissolving acid and a water wetting surfactant.

20 Claims, No Drawings

SYNTHETIC OIL-WATER EMULSION DRILL-IN FLUID CLEANUP METHODS

BACKGROUND OF THE INVENTION

1. Field of the Invention

The present invention relates to improved methods of cleaning up well bore producing intervals drilled with synthetic oil-water emulsion drill-in fluids.

2. Description of the Prior Art

Synthetic oil-water emulsion drill-in fluids are often utilized to drill the producing interval or intervals in oil and gas wells. That is, a conventional oil or water based drilling fluid is used to drill a well bore to a point just above the producing interval, i.e., the target hydrocarbon containing formation or zone. At that point, the conventional drilling fluid containing drill solids is circulated out of the well bore and replaced with a freshly formulated drill-in fluid. The drill-in fluid is then used to drill the producing interval in an effort to minimize damage to the interval which can limit its productivity.

The fluid properties of the drill-in fluid are carefully controlled so that fluid loss into the producing formation or zone is low. The viscosity of the drill-in fluid is also maintained at a relatively high level to prevent solids in deviated wells from settling to the low side of the well bore whereby displacement of the drill-in fluid is more difficult. The drill-in fluid is a highly stable synthetic oil-water emulsion with the synthetic oil being the continuous phase. In order to add stability to the drill-in fluid, the internal water phase is generally formed of salt water. If the drill-in fluid is weighted, it includes acid soluble weighting materials such as calcium carbonate.

During the drilling of the producing interval with a drill-in fluid of the type described above, filter cake comprised of drill solids and weighting materials builds up on the walls of the well bore. After completion of the well bore through the producing interval, the filter cake along with layers of the drill-in fluid remain on the walls of the well bore thereby plugging the pores and terminating the permeability of the producing interval.

When completion operations are conducted in the producing interval before the drill-in fluid is circulated out, such as the setting of a prepacked screen or other screening device, the filter cake and layers of drill-in fluid on the walls of the well bore are left between the well bore and the screen. When the well is brought on production, the filter cake and drill-in fluid plug at least portions of the screen whereby hydrocarbon production is restricted.

While the filter cake and layers of drill-in fluid remaining in a well bore producing interval have heretofore been cleaned up using acidizing techniques and fluids, a number of problems have been encountered which limit the degree of filter cake and drill-in fluid removal obtained. For example, emulsion blockage on the walls of the well bore and in the formation can occur which limits the contact of an acidizing fluid with the filter cake and drill-in fluid to be removed. The presence of strong oil wetting emulsifiers in the drill-in fluid often prevents or slows the dissolution of acid soluble solids in the filter cake by the acidizing fluid. Also, when the acidizing fluid is displaced over a long producing interval, the rapid dissolution of a portion of the filter cake before the acidizing fluid is displaced through the entire interval can cause the acidizing fluid to be lost into the formation whereby only a portion of the interval is cleaned.

Thus, there are needs for improved methods of cleaning up the producing interval of a well bore drilled using a synthetic oil-water emulsion drill-in fluid whereby the filter cake and drill-in fluid on the walls of the producing interval are completely removed and a high percentage of the original producing interval permeability is regained.

SUMMARY OF THE INVENTION

The present invention provides improved methods of cleaning up a producing interval of a well bore drilled using a synthetic oil-water emulsion drill-in fluid which meet the needs described above and overcome the deficiencies and problems of the prior art. The methods of the present invention for cleaning up a producing interval whereby filter cake and drill-in fluid are removed from the producing interval are basically comprised of a three stage contact process. That is, the filter cake and drill-in fluid are contacted in a first stage with a first treatment fluid comprised of water, a filter cake dissolving acid present in the treatment fluid in a relatively low amount, a mutual solvent for making otherwise insoluble materials soluble in the treatment fluid and an emulsion penetrating agent for breaking up emulsion blockage. The filter cake and drill-in fluid are then contacted in a second stage with a second treatment fluid comprised of water, a relatively high amount of filter cake dissolving acid, a mutual solvent and an emulsion penetrating agent. Thereafter, the filter cake and synthetic oil-water emulsion remaining in the producing interval are contacted in a third stage with a third treatment fluid comprised of water, a relatively high amount of filter cake dissolving acid and an effective amount of a water wetting surfactant for changing the wettability of the solid materials making up the walls of the well bore from oil wet to water wet thereby promoting hydrocarbon production.

Thus, it is a general object of the present invention to provide improved synthetic oil-water emulsion drill-in fluid clean up methods.

Other and further objects, features and advantages of the present invention will be readily apparent to those skilled in the art upon a reading of the description of preferred embodiments which follows.

DESCRIPTION OF PREFERRED EMBODIMENTS

Synthetic oil-water emulsion drill-in fluids which are well known to those skilled in the art are generally made up of a synthetic oil comprised of oligermized olefins, esters or ethers, salt water containing sodium chloride or calcium chloride and one or more strong oil wetting emulsifiers. The most commonly used synthetic oil is comprised of oligermized olefins.

The methods of the present invention solve the problems heretofore experienced in the clean up of synthetic oil drill-in fluids used in drilling producing intervals. More specifically, the improved methods of the present invention bring about the acid dissolution and displacement of filter cake and drill-in fluid from the walls of the well bore in the producing interval without involving emulsion blockage problems, the prevention of the dissolution of acid soluble materials by oil wetting emulsifiers in the drill-in fluid, lost clean up fluid returns before the clean up fluid is placed over the entire interval and the like which result in less than the optimum regain of producing interval permeability.

The improved methods of the present invention for cleaning up a well bore producing interval drilled using a synthetic oil-water emulsion drill-in fluid, i.e., for removing filter cake and drill-in fluid from the walls of the interval, involve the use of a three stage treatment. That is, the filter cake and drill-in fluid in the producing interval are contacted in a first stage with a first treatment fluid comprised of water, a filter cake dissolving acid present in the treatment fluid in a relatively low amount, i.e., an amount in the range of from about 1% to about 7.5% by weight of the water, a mutual solvent for making otherwise insoluble materials soluble in the treatment fluid present in an amount in the range of from about 10% to about 20% by weight of the water and an emulsion penetrating agent present in an amount in the range of from about 10% to about 20% by weight of the water.

After the displacement of the first treatment fluid, the filter cake and drill-in fluid remaining in the producing interval are contacted in a second stage with a second treatment fluid comprised of water, a filter cake dissolving acid present in the treatment fluid in a relatively high amount, i.e., an amount in the range of from about 10% to about 25% by weight of the water, a mutual solvent present in an amount in the range of from about 10% to about 20% by weight of the water and an emulsion penetrating agent present in an amount in the range of from about 10% to about 20% by weight of the water.

After displacement of the second treatment fluid, the filter cake and drill-in fluid remaining in the producing interval are removed in a third stage with a third treatment fluid comprised of water, a filter cake dissolving acid present in the treating fluid in a relatively high amount, i.e., an amount in the range of from about 10% to about 25% by weight of the water, and an effective amount of a water wetting surfactant which functions to change the wettability of the solid materials making up the walls of the well bore from oil wet to water wet.

Because of the low concentration of acid in the treatment fluid used in the first stage, the treatment fluid is displaced over the entire producing interval without the occurrence of lost returns. Increased quantities of acid are utilized in the second and third treatment fluids whereby increased quantities of filter cake and other acid dissolvable materials are removed before the occurrence of lost returns. The first and second treatment fluids include a mutual solvent for increasing the materials dissolved and removed by the treatment fluid and an emulsion penetrating agent to prevent emulsion blockage of the treatment fluids. The third treatment fluid includes a water wetting surfactant to change the wettability of the solid materials making up the walls of the well bore from oil wet to water wet and to thereby increase the production of hydrocarbons through the walls of the well bore.

The water used in the treatment fluids can be any aqueous fluid which does not adversely react with other components of the treatment fluids or materials in the producing interval. For example, the water can be fresh water, sea water, brine, salt containing water solutions such as sodium chloride solutions, potassium chloride solutions, and calcium chloride solutions, brackish water or the like.

The acid employed in the treatment fluids of this invention is preferably selected from the group consisting of hydrochloric acid, acetic acid, formic acid and mixtures of such acids. As mentioned above, the first treatment fluid contains a relatively low amount of acid in the water, i.e., an amount in the range of from about 1% to about 7.5% by weight of the solution, preferably about 3%. The amounts of acid in the second and third treatment fluids are generally in the range of from about 10% to about 25% by weight of the solutions, preferably about 15%.

In order to prevent the corrosion of metal surfaces in pumping equipment, tubular goods and the like, the treatment fluids preferably each include effective amounts of one or more metal corrosion inhibitors therein. Any of a variety of inorganic acid corrosion inhibitors or organic acid corrosion inhibitors can be used, e.g. inorganic acid corrosion inhibitors comprised of mixtures of quaternary ammonium compounds, unsaturated carbonyl compounds, acetylenic alcohols and the like and organic acid corrosion inhibitors such as rosin amine derivatives with and without intensifiers such as thiourea and derivatives thereof. A preferred inorganic acid corrosion inhibitor for use in the treatment fluids of this invention is comprised of a mixture of quaternized nitrogen heterocycles and acetylenic alcohols. Such a corrosion inhibitor is commercially available under the trade designation "HAI-85M™" from Halliburton Energy Services of Duncan, Okla. An organic acid corrosion inhibitor which is preferred is commercially available under the trade designation "MSA-11™" from Halliburton Energy Services. The corrosion inhibitor is generally included in each treatment fluid in an amount in the range of from about 0.50 to about 1.5 gallons per 1000 gallons of acid in the fluid, preferably in an amount of about 1 gallon per 1000 gallons of acid.

The mutual solvent utilized in the first and second treatment fluids functions to make otherwise insoluble materials soluble in the treatment fluids. Particularly suitable such mutual solvents are comprised of glycol ethers and alkyoxylates of glycol ethers. A particularly preferred mutual solvent is comprised of ethylene glycol monobutyl ether mixed with alkyoxylated alcohol and is commercially available under the trade designation "MUSOL A™" from Halliburton Energy Services of Duncan, Okla. The mutual solvent is generally included in each of the first and second treatment fluids in an amount in the range of from about 10% to about 20% by weight of water in the fluids, preferably in an amount of about 15%.

The emulsion penetrating agent included in the first and second treatment fluids is preferably a mixture of an alkyl alcohol, an emulsifying agent, a mutual solvent and a co-solvent. Such a penetrating agent is described in U.S. Pat. No. 5,008,026 issued to Gardner, et al. on Apr. 16, 1991 and is commercially available under the trade designation "PEN-88™" from Halliburton Energy Services of Duncan, Okla. The penetrating agent is generally included in each of the first and second treatment fluids in an amount in the range of from about 10% to about 20% by weight of water in the fluids, preferably in an amount of about 15%.

The water wetting surfactant utilized in the third treatment fluid of this invention is a strong water wetting surfactant capable of changing the wettability of the solid materials making up the walls of the well bore from oil wet to water wet. A preferred such surfactant is comprised of nonylphenol ethoxylated with 8–10 moles of ethylene oxide and terminating with a sodium carboxylate group. This surfactant is commercially available under the trade designation "EMCOL CNP 110™" from the Witco Chemical Company of Houston, Tex. The water wetting surfactant is generally included in the third treatment fluid in an amount in the range of from about 5% to about 10% by weight of water in the fluid, preferably in an amount of about 7.5%.

In order to further illustrate the methods of the present invention, the following examples are given.

EXAMPLE

Various combinations of treatment fluids were tested to determine their effectiveness in removing filtercake and synthetic oil-water emulsion drill-in fluid from Berea sandstone core samples. The tests were conducted in a dynamic fluid loss test apparatus at 180° F., a pressure differential of 500 psi, a drill-in fluid stir rate of 300 rpm and a stirred drill-in fluid filtercake producing time of 3 hours prior to each test. The sandstone core samples used had oil permeabilities of from about 50 md to about 200 md prior to having filter cake produced thereon by drill-in fluid.

The test procedure consisted of determining the oil permeability of a core sample. Thereafter, the core sample was subjected to contact with stirred drill-in fluid for 3 hours whereby filter cake was formed on the core sample. The drill-in fluid was then displaced from the test apparatus by the staged treatment fluids tested with each treatment fluid being placed into stirred contact with the core sample for about 7.5 minutes. Filtrate was collected during the stirred contact times. After the stirred contact time, each treatment fluid was allowed to remain in static contact with the core sample (soak) for 60 minutes. At the end of the contact with the staged treatment fluids, the oil permeability of the core sample was again determined which was compared with the original oil permeability of the core sample. This comparative value (in percent) is a measure of the permeability regained as a result of the staged treatment.

In addition, if the core sample permeability increased to the point whereby filtrate control was lost during a test, the stage of the treatment at the time of such loss was noted and the collection of filtrate was stopped. Also, at the end of the test, the wettability condition of the core sample (oil wet or water wet) and its reactivity to fresh unspent acid were determined.

The drill-in fluid used in the tests was a field sample (containing drilled formation cuttings) of an oligomerized olefin synthetic oil (continuous phase)—salt water emulsion commercially available under the tradename "NOVA-PLUS®" from M-I Drilling Fluids Co. of Houston, Tex.

The staged treatment fluids used are given in Table I below and the results of the tests are given in Table II.

TABLE I

STAGED TREATMENT FLUIDS

| STAGED TREATMENT FLUIDS IDENTIFICATION LETTER | STAGED TREATMENT FLUIDS DESCRIPTION |
|---|---|
| A | A 10% by weight aqueous hydrochloric acid solution containing 0.0015% by volume metal corrosion inhibitor$^1$; followed by a mixture of heavy aromatic naptha and napthalene having 5% by weight of a first non-ionic emulsifying surfactant$^2$ and 5% by weight of a second non-ionic emulsifying surfactant$^3$ combined therewith; followed by a second 10% by weight aqueous hydrochloric acid solution containing 0.0015% by volume of a metal corrosion inhibitor$^1$. |
| B | A 10% by weight aqueous hydrochloric acid solution containing 0.0015% by volume metal corrosion inhibitor$^1$ and 5% by weight of a mutual solvent$^4$; followed by a mixture of heavy aromatic naptha and naphthalene having 5% by weight of a first non-ionic emulsifying surfactant$^2$ and by weight of a second non-ionic emulsifying surfactant$^3$ combined therewith; followed by a second 10% by weight aqueous hydrochloric acid solution containing 0.0015% by volume corrosion inhibitor$^1$ and 5% by weight of a mutual solvent$^4$. |
| C | A 15% by weight aqueous hydrochloric acid solution containing 0.0015% by volume metal corrosion inhibitor$^1$, 10% by weight of a mutual solvent$^4$ and 5% by weight of an emulsion penetrating agent$^5$; followed by a mixture of heavy aromatic naphtha and naphthalene having 5% by weight of a first non-ionic emulsifying surfactant$^2$, 5% by weight of a second ion-ionic emulsifying surfactant$^3$ and 5% by weight of an emulsion penetrating agent$^5$ combined therewith; followed by a second 15% by weight aqueous hydrochloric acid solution containing 0.0015% by volume of a metal corrosion inhibitor$^1$, 10% by weight of a mutual solvent$^4$ and 5% by weight of all emulsion penetrating agent$^5$. |
| D | A 15% by weight aqueous hydrochloric acid solution containing 0.0015% by volume metal corrosion inhibitor$^1$, 15% by weight of a mutual solvent$^4$ and 5% by weight of an emulsion penetrating agent$^5$; followed by a mixture of heavy aromatic naphtha and naphthalene having 5% by weight of a first non-ionic emulsifying surfactant$^2$, 5% by weight of a second non-ionic emulsifying surfactant$^3$ and 5% by weight of an emulsion penetrating agent$^5$ combined therewith; followed by a second 15% by weight aqueous hydrochloric acid solution containing 0.0015% by volume of a metal corrosion inhibitor$^1$, 15% by weight of a mutual solvent$^4$ and 5% by weight of an emulsion penetrating agent$^5$; followed by a third 15% by weight aqueous hydrochloric acid solution containing 0.0015% by volume of a metal corrosion inhibitor$^1$, 15% by weight of a mutual solvent$^4$ and 5% by weight of an emulsion pelletrating agent$^{5.}$ |
| E | A 3% by weight aqueous hydrochloric acid solution containing 0.0015% by volume metal corrosion inhibitor$^1$, 15% by weight of a mutual solvent and 5% by weight of an emulsion penetrating agent$^5$; followed by a 15% by weight aqueous hydrochloric acid solution containing 0.0015% by volume of a metal corrosion inhibitor$^1$, 15% by weight of a mutual solvent$^4$, 5% by weight of a first anionic wetting surfactant$^6$ and 5% by weight of a second anionic wetting surfactant$^7$. |
| F | A 5% by weight aqueous hydrochloric acid solution containing 0.0015% by volume of a metal corrosion inhibitor$^1$ and 5% by weight of an emulsion penetrating agent$^5$; followed by a 15% by weight aqueous hydrochloric acid solution containing 0.0015% by volume of a metal corrosion inhibitor$^1$ and 5% by weight of an emulsion penetrating agent$^5$; followed by a 15% by weight aqueous hydrochloric acid solution containing 0.0015% by volume of a metal corrosion inhibitor$^1$ and 5% by weight of an anionic surfactant$^8$. |
| G | A 3% by weight aqueous hydrochloric acid solution containing 0.0015% by volume of a metal corrosion inhibitor and 5% by weight of an emulsion penetrating agent$^5$ ; followed by a mixture of heavy aromatic naphtha and naphthalene having 5% by weight of a first non-ionic emulsifying surfactant$^2$, 5% by weight of a second non-ionic emulsifying surfactant$^3$ and 5% by weight of an emulsion penetrating agent$^5$ combined therewith; followed by a 15% by weight aqueous hydrochloric acid solution containing 0.0015% by volume of a metal corrosion inhibitor$^1$ and 5% by weight of an emulsion penetrating agent$^5$; followed by a 15% by weight aqueous hydrochloric acid solution containing 0.0015% by volume of a metal corrosion inhibitor$^1$ and 5% by weight of an anionic wetting surfactant$^8$. |
| H | A 3% by weight aqueous hydrochloric acid solution containing 0.0015% by volume metal corrosion inhibitor$^1$, 15% by weight of a mutual solvent$^4$ and 5% by weight of an emulsion penetrating agent$^5$; followed by a 15% by weight |

TABLE I-continued

STAGED TREATMENT FLUIDS

| STAGED TREATMENT FLUIDS IDENTIFICATION LETTER | STAGED TREATMENT FLUIDS DESCRIPTION |
|---|---|
|  | aqueous hydrochloric acid solution containing 0.0015% by volume of a metal corrosion inhibitor[1] and 15% by weight of an emulsion penetrating agent[5]; followed by 15% by weight aqueous hydrochloric acid solution containing 0.0015% by volume of a metal corrosion inhibitor[1] and 7.5% by weight of a wetting surfactant[9]. |
| I | A 3% by weight aqueous hydrochloric acid solution containing 0.0015% by volume metal corrosion inhibitor[1], 15% by weight of a mutual solvent[4] and 5% by weight of an emulsion penetrating agent[5]; followed by a mixture of heavy aromatic naphtha and naphthalene having 5% by weight of a first non-ionic emulsifying surfactant[2], 5% by weight of a second non-ionic emulsifying surfactant[3] and 5% by weight of an emulsion penetrating agent[5] combined therewith; followed by a 15% by weight aqueous hydrochloric acid solution containing 0.0015% by volume of a metal corrosion inhibitor[1] and 15% by weight of an emulsion penetrating agent[5]; followed by 15% by weight aqueous hydrochloric acid solution containing 0.0015% by volume of a metal corrosion inhibitor[1] and 7.5% by weight of a wetting surfactant[9]. |
| J | A 3% by weight aqueous hydrochloric acid solution containing 0.0015% by volume metal corrosion inhibitor[1], 15% by weight of a mutual solvent[4] and 5% by weight of an emulsion penetrating agent[5]; followed by a 15% by weight aqueous hydrochloric acid solution containing 0.0015% by volume of a metal corrosion inhibitor[1] and 15% by weight of an emulsion penetrating agent[5]; followed by 15% by weight aqueous hydrochloric acid solution containing 0.0015% by volume of a metal corrosion inhibitor[1] and 7.5% by weight of a wetting surfactant[9]. |
| K | A 3% by weight aqueous hydrochloric acid solution containing 0.0015% by volume metal corrosion inhibitor[1], 15% by weight of a mutual solvent[4] and 5% by weight of an emulsion penetrating agent[5]; followed by a 15% by weight hydrochloric acid solution containing 0.0015% by volume metal corrosion inhibitor[1], 5% by weight of a first anionic wetting surfactant[6] and 5% by weight of a second anionic wetting surfactant[7]. |
| L | A 3% by weight aqueous hydrochloric acid solution containing 0.0015% by volume metal corrosion inhibitor[1], 15% by weight of a mutual solvent[4] and 5% by weight of an emulsion penetrating agent[5]; followed by a 15% by weight aqueous hydrochloric acid solution containing 0.0015% by volume of a metal corrosion inhibitor[1] and 15% by weight of an emulsion penetrating agent[5]; followed by 15% by weight aqueous hydrochloric acid solution containing 0.0015% by volume of a metal corrosion inhibitor[1] and 7.5% by weight of a wetting surfactant[9]. |

[1] A mixture of quaternized nitrogen heterocycles and acetylenic alcohols commercially available from Halliburton Energy Services under the trade designation "HAI-85 ™".
[2] A non-ionic emulsifying surfactant comprising $C_{10}$ to $C_{12}$ aliphatic alcohols polyoxylated with 5 moles of polyethylene oxide.
[3] A non-ionic emulsifying surfactant comprised of an alkyl aryl sulfonate.
[4] A mutual solvent comprised of ethylene glycol monobutyl ether and alkoxylated alcohol commercially available from Halliburton Energy Services under the trade designation "MUSOL A ® ".
[5] An emulsion penetrating agent commercially available from Halliburton Energy Services under the trade designation "PEN-88 ®.
[6] An anionic water wetting surfactant comprised of 2 sodium, 2 hexyl sulfate.
[7] An anionic water wetting surfactant comprised of sodium dioctyl sulfosuccinate.
[8] An anionic water wetting surfactant comprised of an alpha olefin sulfonate.
[9] A water wetting surfactant comprised of nonylphenol ethoxylated with 8 to 10 moles of ethylene oxide and terminating with a sodium carboxylate group.

TABLE II

TEST RESULTS

| Test No. | Sequential Treatment Fluids Used | Regained Permeability | Estimate of Filtercake Remaining | Loss of Filtrate Control | Core Condition, Oil Wet or Water Wet | Core Reactivity To Acid |
|---|---|---|---|---|---|---|
| 1 | A | 25% | All | — | — | — |
| 2 | B | 11% | All | — | — | — |
| 3 | C | 18% | None | — | — | — |
| 4 | D | 50% | All | Third Treatment Fluid | Oil Wet | Reactive |
| 5 | E | 50% | All | Second Treatment Fluid | Oil Wet | Reactive |
| 6 | F | 27% | Slight | None | Oil Wet | Reactive |
| 7 | G | 30% | Slight | Third Treatment Fluid | Water Wet | — |
| 8 | H | 67% | All | — | Water Wet | Non-Reactive |
| 9 | I | 59% | Slight | Fourth Treatment Fluid | Water Wet | Non-Reactive |
| 10 | J[1] | 76% | None | Third Treatment Fluid | Water Wet | Non-Reactive |
| 11 | K | 52% | Slight | None | Water Wet | Reactive |
| 12 | L[2] | 76% | None | First Treatment Fluid | Water Wet | Non-Reactive |

[1] Thirteen hour soak time.
[2] Drill-in fluid did not contain drill solids.

From Table II, it can be seen that the staged treatment fluids of this invention (Fluids H, J and L) effectively removed the filter cake and drill-in fluid from the core samples and left the core samples water wet and non-reactive.

What is claimed is:

1. A method of cleaning up a producing interval of a well bore drilled using a synthetic oil-water emulsion drill-in fluid and having filter cake and drill-in fluid on the walls thereof comprising the steps of:

(a) contacting said filter cake and drill-in fluid in a first stage with a first treatment fluid comprised of water, a filter cake dissolving acid present in said treatment fluid in an amount in the range of from about 1% to about 7.5% by weight of said water, a mutual solvent for making otherwise insoluble materials soluble in said treatment fluid present in an amount in the range of from about 10% to about 20% by weight of said water and an emulsion penetrating agent present in an amount in the range of from about 10% to about 20% by weight of said water;

(b) contacting said filter cake and drill-in fluid in a second stage with a second treatment fluid comprised of water, a filter cake dissolving acid present in said treatment fluid in an amount in the range of from about 10% to about 25% by weight of said water, a mutual solvent present in an amount in the range of from about 10% to about 20% by weight of said water and an emulsion penetrating agent present in an amount in the range of from about 10% to about 20% by weight of said water; and (c) contacting said filter cake and said drill-in fluid in a third stage with a third treatment fluid comprised of water, a filter cake dissolving acid present in said treatment fluid in an amount in the range of from about 10% to about 25% by weight of said water and an effective amount of a water wetting surfactant to change the wettability of said walls of said well bore from oil wet to water wet.

2. The method of claim 1 wherein said first, second and third treatment fluids all further comprise effective amounts of one or more metal corrosion inhibitors therein.

3. The method of claim 2 wherein said metal corrosion inhibitors are comprised of mixtures of quaternized nitrogen heterocycles and acetylenic alcohols.

4. The method of claim 1 wherein said acids in said first, second and third treatment fluids are selected from the group consisting of hydrochloric acid, acetic acid, formic acid and mixtures thereof.

5. The method of claim 1 wherein said mutual solvents in said first and second treatment fluids are comprised of glycol ethers and alkyoxylates of glycol ethers.

6. The method of claim 5 wherein said mutual solvents are comprised of ethylene glycol monobutyl ether.

7. The method of claim 1 wherein said penetrating agents in said first and second treatment fluids are mixtures of an alkyl alcohol, an emulsifying agent, a mutual solvent and a co-solvent.

8. The method of claim 1 wherein said water wetting surfactant in said third treatment fluid is nonyl phenol ethoxylated with 8 to 10 moles of ethyleneoxide and terminating with a sodium carboxylate group and is present in said third treatment fluid in an amount in the range of from about 5% to about 10% by weight of said water therein.

9. The method of claim 1 wherein said synthetic oil in said drill-in fluid is the continuous phase of said oil-water emulsion and is comprised of oligomerized olefins, esters or ethers.

10. The method of claim 1 wherein said water in said drill-in fluid is salt water.

11. The method of claim 1 wherein said drill-in fluid contains particulate calcium carbonate weighting material.

12. A method of cleaning up a producing interval of a well bore drilled using a synthetic oil-water emulsion drill-in fluid and having filter cake and drill-in fluid on the walls thereof comprising the steps of:

(a) contacting said filter cake and drill-in fluid in a first stage with a first treatment fluid comprised of water, hydrochloric acid present in said treatment fluid in an amount of about 3% by weight of said water, an effective amount of a metal corrosion inhibitor, a mutual solvent comprised of ethylene glycol monobutyl ether present in an amount of about 15% by weight of said water and an emulsion penetrating agent comprised of a mixture of an alkyl alcohol, an emulsifying agent, a mutual solvent and a co-solvent present in an amount of about 15% by weight of said water;

(b) contacting said filter cake and drill-in fluid in a second stage with a second treatment fluid comprised of water, hydrochloric acid present in said treatment fluid in an amount of about 15% by weight of said water, an effective amount of a metal corrosion inhibitor, a mutual solvent comprised of ethylene glycol montobutyl ether present in an amount of about 15% by weight of said water and an emulsion penetrating agent comprised of a mixture of an alkyl alcohol, an emulsifying agent, a mutual solvent and a co-solvent present in an amount of about 15% by weight of said water; and then (c) contacting said filter cake and drill-in fluid in a third stage with a third treatment fluid comprised of water, hydrochloric acid present in said treatment fluid in an amount of about 15% by weight of said water, an effective amount of a metal corrosion inhibitor and an effective amount of a water wetting surfactant to change the wettability of said walls of said well bore from oil wet to water wet.

13. The method of claim 12 wherein said metal corrosion inhibitors in said first, second and third treatment fluids are comprised of mixtures of quaternized nitrogen heterocycles and acetylenic alcohols.

14. The method of claim 12 wherein said metal corrosion inhibitors are present in said treatment fluids in amounts of about 1 gallon per 1000 gallons of acid in said fluids.

15. The method of claim 12 wherein said water wetting surfactant in said third treatment fluid is comprised of nonyl phenol ethoxylated with 8 to 10 moles of ethylene oxide and terminating with a sodium carboxylate group.

16. The method of claim 15 wherein said water wetting surfactant is present in said third treatment fluid in an amount of about 7.5% by weight of said water therein.

17. The method of claim 12 wherein said synthetic oil in said drill-in fluid is the continuous phase of said oil-water emulsion and is comprised of oligomerized olefins.

18. The method of claim 12 wherein said water in said drill-in fluid is salt water.

19. The method of claim 12 wherein said drill-in fluid contains particulate calcium carbonate weighting material.

20. The method of claim 18 wherein said salt in said water is sodium chloride or calcium chloride.

* * * * *